United States Patent
Zhang et al.

(10) Patent No.: US 9,913,254 B2
(45) Date of Patent: Mar. 6, 2018

(54) METHOD AND APPARATUS FOR INDICATING SUBFRAMES ASSOCIATED WITH A HYBRID AUTOMATIC REPEAT REQUEST FEEDBACK

(71) Applicant: Nokia Solutions and Networks Oy, Espoo (FI)

(72) Inventors: Li Zhang, Beijing (CN); Chun Hai Yao, Beijing (CN)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 13/957,723

(22) Filed: Aug. 2, 2013

(65) Prior Publication Data

US 2014/0036814 A1    Feb. 6, 2014

(30) Foreign Application Priority Data

Aug. 3, 2012    (WO) ................. PCT/CN2012/079688

(51) Int. Cl.
*H04W 4/00* (2009.01)
*H04W 72/04* (2009.01)
*H04W 72/12* (2009.01)
*H04L 5/00* (2006.01)

(52) U.S. Cl.
CPC ....... *H04W 72/04* (2013.01); *H04W 72/1294* (2013.01); *H04L 5/001* (2013.01); *H04L 5/0005* (2013.01); *H04L 5/0055* (2013.01)

(58) Field of Classification Search
USPC .......................... 370/329, 330, 331, 332, 341
See application file for complete search history.

(56) References Cited

U.S. PATENT DOCUMENTS

| | | |
|---|---|---|
| 2002/0173295 A1 | 11/2002 | Nykanen et al. |
| 2007/0066340 A1 | 3/2007 | Yoon et al. |
| 2009/0213769 A1 | 8/2009 | Shen et al. ..................... 370/280 |
| 2012/0034927 A1 | 2/2012 | Papasakellariou et al. |
| 2012/0099491 A1 | 4/2012 | Lee et al. |
| 2012/0127950 A1 | 5/2012 | Chung et al. ................. 370/329 |
| 2013/0242816 A1* | 9/2013 | He ...................... H04W 52/243 370/280 |

(Continued)

FOREIGN PATENT DOCUMENTS

| | | |
|---|---|---|
| CN | 1267161 A | 9/2000 |
| CN | 101473557 A | 7/2009 |

(Continued)

OTHER PUBLICATIONS

A search report has been issued in a counterpart foreign application (EP 13 17 7339), dated Mar. 9, 2017.

(Continued)

*Primary Examiner* — Zewdu A Beyen
(74) *Attorney, Agent, or Firm* — Harrington & Smith (57) ABSTRACT

A method includes communicating with a first cell using a first uplink and downlink configuration and a second cell using a second uplink and downlink configuration, said first cell having predetermined configuration; providing communication feedback for said first cell and the second cell on said second cell using a physical uplink shared channel; and determining a codebook size for said feedback in dependence on downlink assignment indicator information received in an uplink grant.

6 Claims, 5 Drawing Sheets

(56) References Cited

U.S. PATENT DOCUMENTS

| | | | | |
|---|---|---|---|---|
| 2013/0329704 A1* | 12/2013 | Lee | ................... | H04L 1/1893 370/336 |
| 2013/0336160 A1* | 12/2013 | Yin et al. | ................... | 370/254 |
| 2014/0036814 A1 | 2/2014 | Zhang et al. | ................... | 370/329 |

FOREIGN PATENT DOCUMENTS

| | | | |
|---|---|---|---|
| CN | 101946447 | A | 1/2011 |
| CN | 102474495 | A | 5/2012 |
| CN | 102577210 | A | 7/2012 |
| EP | 1241830 | A1 | 9/2002 |
| EP | 2 693 823 | A2 | 2/2014 |
| JP | 2012/147131 | A | 8/2012 |
| JP | 2015/520526 | A | 7/2015 |
| JP | 2015/530011 | A | 10/2015 |
| RU | 2417526 | C2 | 4/2011 |
| WO | WO-02/13556 | A2 | 2/2002 |
| WO | WO 2011/044170 | A1 | 4/2011 |
| WO | WO 2012/068141 | A1 | 5/2012 |
| WO | WO 2012/081920 | A2 | 6/2012 |
| WO | WO 2014/018984 | A1 | 1/2014 |

OTHER PUBLICATIONS

Email Rapporteur (CMCC): *Email Summary on Inter-Band TDD CA* 3GPP Draft: R1-122708 Email Summary Interband TDD CA, 3$^{rd}$ Generation Partnership Project (3GPP), Mobile Competence Centre; 650; Route Des Lucioles; F-06921 Sophia-Antipolis Cedex; France, vol. RAN WG1, No. Prague, Czech Republic; May 21, 2012-May 25, 2012, May 25, 2012 XP050601167.

Nokia Siemens Networks et al: *Full Duplex Operation with Inter-Band CA with Different TDD Configurations on Different Bands* 3GPP Draft; R1-122397 Inter Band CA Full, 3$^{rd}$ Generation Partnership Project (3GPP), Mobile Competence Centre; 650, Route Des Lucioles; F-06921 Sophia-Antipolis Cedex; France, vol. Ran WG1, no. Prague, Czech; May 21, 2012-May 25, 2012, May 12, 2012 XP050600654.

Huawei et al: *Coding and Resource Mapping for UCI on PUSCH* 3GPP Draft; R1-110009, 3$^{rd}$ Generation Partnership Project (3GPP), Mobile Competence Centre; 650, Route Des Lucioles; F-06921 Sophia-Antipolis Cedex; France, vol. Ran WG1, no. Dublin, Ireland; Jan. 17, 2011, Jan. 11, 2011 XP050489995.

R1-122031; CATT; "HARQ-ACK feedback for TDD inter-band CA"; 3GPP TSG RAN WG1 Meeting #69; Prague, Czech Republic, May 21-25, 2012.

R1-122220; Samsung; "Discussion on PUCCH HARQ-ACK transmission"; 3GPP TSG RAN WG1 #69; Prague, Czech Republic, May 21-25, 2012.

3GPP TS 36.213 V10.6.0, "3$^{rd}$ Generation Partnership Project; Technical Specification Group Radio access Network; Evolved Universal Terrestrial Radio Access (E-UTRA); Physical layer procedures (Release 10)", Jun. 2012, 125 pgs.

R1-122708, 3GPP TSG-RAN WG1 #69, "Email summary on inter-band TDD CA", Email Rapporteur (CMCC), May 21-25, 2012 30 pgs.

* cited by examiner

FIG.1

| SCell SIB-1 UL-DL Configuration / PDSCH HARQ TIMING ON SCELL FOLLOWS TDD UL-DL CONFIGURATION # | 0 | 1 | 2 | 3 | 4 | 5 | 6 |
|---|---|---|---|---|---|---|---|
| 0 |  | 1A | 2A | 3A | 4A | 5A | 6A |
| 1 | 1B |  | 2A | 4C | 4C | 5A | 1B |
| 2 | 2B | 2B |  | 5C | 5C | 5A | 2B |
| 3 | 3B | 4C | 5C |  | 4A | 5A | 3B |
| 4 | 4B | 4B | 5B | 4B |  | 5A | 4B |
| 5 | 5B | 5B | 2A | 3A | 5B |  | 5B |
| 6 | 6B | 1A | 2A | 3A | 4A | 5A |  |
|  | CASE A | CASE B | CASE C |  |  |  |  |

NOTES: THE NUMBER IN THE GRID IS THE REFERENCE UL-DL CONFIGURATION WHICH SCELL PDSCH HARQ TIMING FOLLOWS

FIG. 4

| UL-DL CONFIGURATION | Subframe n | | | | | | | | | |
|---|---|---|---|---|---|---|---|---|---|---|
| | 0 | 1 | 2 | 3 | 4 | 5 | 6 | 7 | 8 | 9 |
| 0 | – | – | 6 | – | 4 | – | – | 6 | – | 4 |
| 1 | – | – | 7, 6 | 4 | – | – | – | 7, 6 | 4 | – |
| 2 | – | – | 8, 7, 4, 6 | – | – | – | – | 8, 7, 4, 6 | – | – |
| 3 | – | – | 7, 6, 11 | 6, 5 | 5, 4 | – | – | – | – | – |
| 4 | – | – | 12, 8, 7, 11 | 6, 5, 4, 7 | – | – | – | – | – | – |
| 5 | – | – | 13, 12, 9, 8, 7, 5, 4, 11, 6 | – | – | – | – | – | – | – |
| 6 | – | – | 7 | 7 | 5 | – | – | 7 | 7 | – |

FIG.5

| UL/DL CONFIGURATION | SWITCHING-POINT PERIODICITY | SUBFRAME NUMBER | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

FIG.6

UL DAI=3

| DL DAI=1 | NOT SCHEDULED | DL DAI=2 | DL DAI=3 |
|---|---|---|---|

FIG.7

METHOD AND APPARATUS FOR INDICATING SUBFRAMES ASSOCIATED WITH A HYBRID AUTOMATIC REPEAT REQUEST FEEDBACK

This disclosure relates to methods and apparatus and in particular but not exclusively to methods and apparatus for use in inter band time division duplexing carrier aggregation.

A communication system can be seen as a facility that enables communication sessions between two or more nodes such as fixed or mobile devices, machine-type terminals, access nodes such as base stations, servers and so on. A communication system and compatible communicating entities typically operate in accordance with a given standard or specification which sets out what the various entities associated with the system are permitted to do and how that should be achieved. For example, the standards, specifications and related protocols can define the manner how devices shall communicate, how various aspects of communications shall be implemented and how devices for use in the system shall be configured.

A user can access the communication system by means of an appropriate communication device. A communication device of a user is often referred to as user equipment (UE) or terminal. A communication device is provided with an appropriate signal receiving and transmitting arrangement for enabling communications with other parties. Typically a device such as a user equipment is used for enabling receiving and transmission of communications such as speech and content data.

Communications can be carried on wireless carriers. Examples of wireless systems include public land mobile networks (PLMN) such as cellular networks, satellite based communication systems and different wireless local networks, for example wireless local area networks (WLAN). In wireless systems a communication device provides a transceiver station that can communicate with another communication device such as e.g. a base station of an access network and/or another user equipment. The two directions of communications between a base station and communication devices of users have been conventionally referred to as downlink and uplink. Downlink (DL) can be understood as the direction from the base station to the communication device and uplink (UL) the direction from the communication device to the base station.

Some systems use FDD (frequency division duplexing) and other systems use TDD (time division duplexing). With FDD, different frequencies are used for UL and DL communications with a UE. With TDD, the same frequency is used for UL and DL communications but different time slots are allocated for UL and DL communication.

Carrier aggregation has been proposed and this allows the bandwidth associated with a UE to be expanded by concurrently using radio resources across multiple carriers. The multiple component carriers are aggregated to form a larger overall transmission bandwidth.

Control information may be communicated for example on a physical uplink control channel (PUCCH). For example, signalling for the purposes of error detection and/or correction may be provided by means of such signalling. Requests for retransmission of any information that the recipient node did not successfully receive are possible. For example, hybrid automatic repeat request (HARQ) error control mechanism may be used for this purpose. The error control mechanism can be implemented such that a transmitting device shall receive either a positive or a negative acknowledgement (ACK/NACK; A/N) or other indication regarding its transmission from a receiving device.

UL control information may be communicated on a physical uplink shared channel (PUSCH) if the PUSCH is scheduled for UL data transmission.

HARQ can be used in the context of carrier aggregation (CA). As mentioned previously, in carrier aggregation more than one carrier can be used for communications between two devices. HARQ feedback for one carrier may be transmitted on the Physical Uplink Control Channel (PUCCH) of another carrier.

Inter band TDD (time division duplex) CA with different UL and DL configurations on the different bands has been proposed. This may cause complexities with respect to HARQ feedback because HARQ timing in TDD is coupled to the UL/DL configuration.

In a first aspect there is provided a method comprising communicating with a first cell using a first uplink and downlink configuration and a second cell using a second uplink and downlink configuration, said first cell having predetermined configuration; providing communication feedback for said first cell and the second cell on said second cell using a physical uplink shared channel; and determining a codebook size for said feedback in dependence on downlink assignment indicator information received in an uplink grant.

In a second aspect there is provided a method comprising communicating with a first cell using a first uplink and downlink configuration and a second cell using a second uplink and downlink configuration, said first cell having a predetermined configuration; providing communication feedback for said first cell and the second cell on said first cell using a physical uplink shared channel; and determining a codebook size for said feedback using one of a timing reference uplink and downlink configuration of said first and second cell, and downlink assignment indicator information received in an uplink grant.

Preferably the method comprises receiving a 2 bit downlink assignment indicator in an uplink grant which schedules physical uplink shared channel.

Preferably the uplink grant is received on the same cell as the physical uplink shared channel.

Preferably the uplink grant is received on a different cell to the physical uplink shared channel.

In a third aspect there is provided a method comprising: communicating with a first cell using a first uplink and downlink configuration and a second cell using a different uplink and downlink configuration; and using downlink assignment indicator information in a downlink grant.

Preferably the method comprises using said downlink assignment for communication feedback on received communications.

Preferably one of said first and second cell has a predetermined configuration.

Preferably said predetermined configuration comprises uplink downlink configuration 0.

Preferably one of said first and second cells comprises a primary cell and the other of said first and second cells comprises a secondary cell.

Preferably said communication feedback comprises hybrid automatic repeat request.

Preferably said physical uplink shared channel is scheduled by uplink grant.

Preferably said first cell and said second cell provide an aggregated carrier.

Preferably said first uplink and downlink configuration is a SIB1 uplink and downlink configuration and the second uplink and downlink configuration is a SIB1 uplink and downlink configuration.

In a fourth aspect there is provided an apparatus comprising at least one processor and at least one memory including computer code for one or more programs, the at least one memory and the computer code configured, with the at least one processor, to cause the apparatus at least to; communicate with a first cell using a first uplink and downlink configuration and a second cell using a second uplink and downlink configuration, said first cell having predetermined configuration; provide communication feedback for said first cell and the second cell on said second cell using a physical uplink shared channel; and determine a codebook size for said feedback in dependence on downlink assignment indicator information received in an uplink grant.

In a fifth aspect there is provided an apparatus comprising at least one processor and at least one memory including computer code for one or more programs, the at least one memory and the computer code configured, with the at least one processor, to cause the apparatus at least to; communicate with a first cell using a first uplink and downlink configuration and a second cell using a second uplink and downlink configuration, said first cell having a predetermined configuration; provide communication feedback for said first cell and the second cell on said first cell using a physical uplink shared channel; and determine a codebook size for said feedback using one of a timing reference uplink and downlink configuration of said first and second cell, and downlink assignment indicator information received in an uplink grant.

In a sixth aspect there is provided an apparatus comprising at least one processor and at least one memory including computer code for one or more programs, the at least one memory and the computer code configured, with the at least one processor, to cause the apparatus at least to: communicate with a first cell using a first uplink and downlink configuration and a second cell using a different uplink and downlink configuration; and use downlink assignment indicator information in a downlink grant.

Preferably the at least one memory and the computer code are configured with the at least one processor to cause the apparatus to use said downlink assignment for communication feedback on received communications.

Preferably the at least one memory and the computer code are configured with the at least one processor to cause the apparatus to use said downlink assignment for defining a bundling window size for said communication feedback.

Preferably one of said first and second cell has a predetermined configuration.

Preferably said predetermined configuration comprises uplink downlink configuration 0.

Preferably one of said first and second cells comprises a primary cell and the other of said first and second cells comprises a secondary cell.

Preferably said communication feedback comprises hybrid automatic repeat request.

Preferably said physical uplink shared channel is scheduled by uplink grant.

Preferably said first cell and said second cell provide an aggregated carrier.

In a seventh aspect there is provided an apparatus comprising means for communicating with a first cell using a first uplink and downlink configuration and a second cell using a second uplink and downlink configuration, said first cell having predetermined configuration; means for providing communication feedback for said first cell and the second cell on said second cell using a physical uplink shared channel; and means for determining a codebook size for said feedback in dependence on downlink assignment indicator information received in an uplink grant.

In an eighth aspect there is provided an apparatus comprising means for communicating with a first cell using a first uplink and downlink configuration and a second cell using a second uplink and downlink configuration, said first cell having a predetermined configuration; means for providing communication feedback for said first cell and the second cell on said first cell using a physical uplink shared channel; and means for determining a codebook size for said feedback using one of said uplink and downlink configuration of said first cell and downlink assignment indicator information received in an uplink grant In a ninth aspect there is provided an apparatus comprising means for communicating with a first cell using a first uplink and downlink configuration and a second cell using a different uplink and downlink configuration; and means for using downlink assignment indicator information in a downlink grant.

Preferably the apparatus is configured to use said downlink assignment for communication feedback on received communications.

Preferably the apparatus is configured to use said downlink assignment for defining a bundling window size for said communication feedback.

Preferably one of said first and second cell has a predetermined configuration.

Preferably said predetermined configuration comprises uplink downlink configuration 0.

Preferably one of said first and second cells comprises a primary cell and the other of said first and second cells comprises a secondary cell.

Preferably said communication feedback comprises hybrid automatic repeat request.

Preferably said physical uplink shared channel is scheduled by uplink grant.

Preferably said first cell and said second cell provide an aggregated carrier.

In a tenth aspect there is provided a user equipment comprising an apparatus as set forth above.

In an eleventh aspect there is provided a computer program comprising computer executable instructions which when run cause the method set forth above.

A node such as a base station or a communication device of a user of machine type terminal can be configured to operate in accordance with the various embodiments.

A computer program comprising program code means adapted to perform the method may also be provided. The computer program may be stored and/or otherwise embodied by means of a carrier medium.

It should be appreciated that any feature of any aspect may be combined with any other feature of any other aspect.

Embodiments will now be described in further detail, by way of example only, with reference to the following examples and accompanying drawings, in which.

In the following certain exemplifying embodiments are explained with reference to a wireless or mobile communication system serving mobile communication devices. Before explaining in detail the exemplifying embodiments, certain general principles of a wireless communication system, access systems thereof, and mobile communication devices are briefly explained with reference to FIGS. 1 to 3 to assist in understanding the technology underlying the described examples.

An example of wireless communication systems are architectures standardized by the 3rd Generation Partnership Project (3GPP). A latest 3GPP based development is often referred to as the long-term evolution (LTE) of the Universal Mobile Telecommunications System (UMTS) radio-access technology. The various development stages of the 3GPP LTE specifications are referred to as releases. More recent developments of the LTE are often referred to as LTE Advanced (LTE-A). The LTE employs a mobile architecture known as the Evolved Universal Terrestrial Radio Access Network (E-UTRAN). Base stations of such systems are known as evolved or enhanced Node Bs (eNBs) and may provide E-UTRAN features such as user plane Radio Link Control/Medium Access Control/Physical layer protocol (RLC/MAC/PHY) and control plane Radio Resource Control (RRC) protocol terminations towards the communication devices. Other examples of radio access system include those provided by base stations of systems that are based on technologies such as wireless local area network (WLAN) and/or WiMax (Worldwide Interoperability for Microwave Access).

Figure 1:
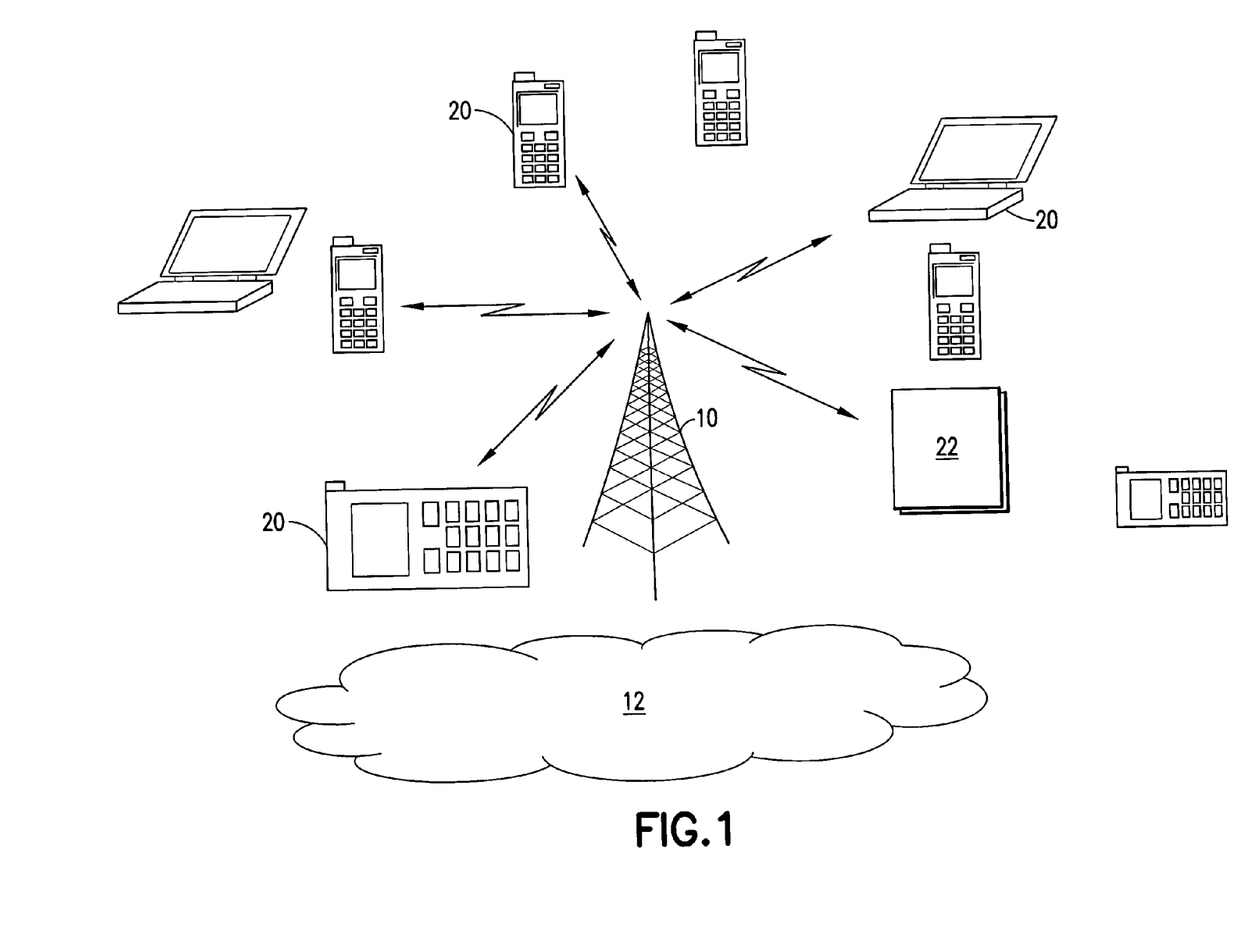
FIG. 1 shows a schematic diagram of a communication system comprising a base station and a plurality of communication devices.

A device capable of wireless communications can communicate via at least one base station or similar wireless transmitter and/or receiver node. In FIG. 1 a base station 10 is shown to be serving various mobile devices 20 and a machine-like terminal 22. Base stations are typically controlled by at least one appropriate controller apparatus so as to enable operation thereof and management of mobile communication devices in communication with the base stations. The base station can be connected further to a broader communications system 12. It shall be understood that a number of neighbouring and/or overlapping access systems or radio service areas provided by a number of base stations may exist. A base station site can provide one or more cells or sectors, each sector providing a cell or a subarea of a cell. Each device and base station may have one or more radio channels open at the same time and may send signals to and/or receive signals from one or more sources. As a plurality of devices can use the same wireless resource, transmissions thereof need to be scheduled to avoid collisions and/or interference.

Figure 2:
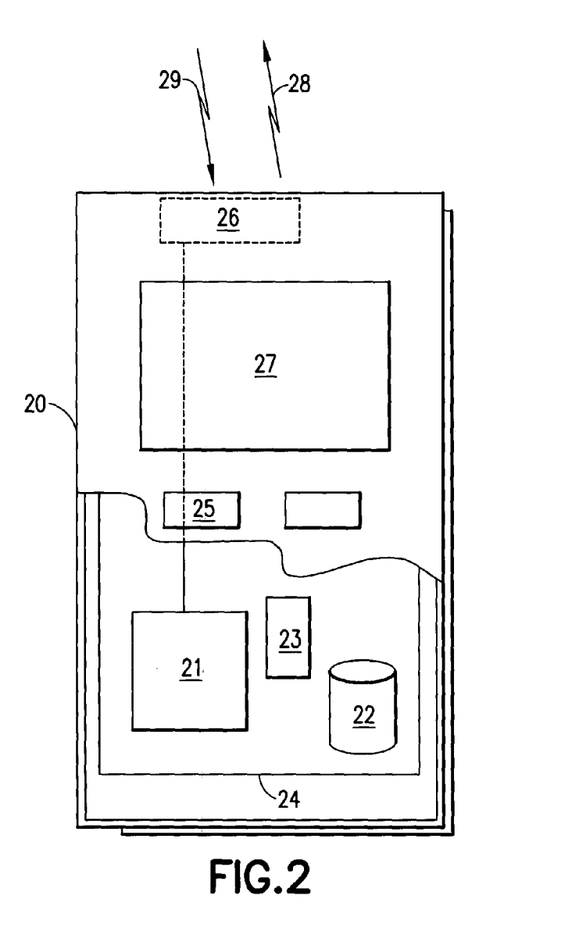
FIG. 2 shows a schematic diagram of a mobile communication device according to some embodiments.

A possible mobile communication device for transmitting in uplink and receiving in downlink will now be described in more detail with reference to FIG. 2 showing a schematic, partially sectioned view of a communication device 20. Such a communication device is often referred to as user equipment (UE) or terminal. An appropriate communication device may be provided by any device capable of sending radio signals to and/or receiving radio signals. Non-limiting examples include a mobile station (MS) such as a mobile phone or what is known as a 'smart phone', a portable computer provided with a wireless interface card or other wireless interface facility, personal data assistant (PDA) provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services include two-way or multi-way calls, data communication or multimedia services or simply an access to a data communications network system, such as the Internet. Non-limiting examples of content data include downloads, television and radio programs, videos, advertisements, various alerts and other information.

The device 20 is configured to receive signals in the downlink 29 over an air interface via appropriate apparatus for receiving and to transmit signals in the uplink 28 via appropriate apparatus for transmitting radio signals. In FIG. 2 the transceiver apparatus is designated schematically by block 26. The transceiver apparatus 26 may be provided for example by means of a radio part and associated antenna arrangement. The antenna arrangement may be arranged internally or externally to the mobile device.

A mobile communication device is also provided with at least one data processing entity 21, at least one memory 22 and other possible components 23 for use in software and hardware aided execution of tasks it is designed to perform, including control of access to and communications with base stations and/or other communication devices. The data processing, storage and other relevant apparatus can be provided on an appropriate circuit board and/or in chipsets. This apparatus is denoted by reference 24.

The user may control the operation of the mobile device by means of a suitable user interface such as key pad 25, voice commands, touch sensitive screen or pad, combinations thereof or the like. A display 27, a speaker and a microphone can be also provided. Furthermore, a communication device may comprise appropriate connectors (either wired or wireless) to other devices and/or for connecting external accessories, for example hands-free equipment, thereto.

Figure 3:
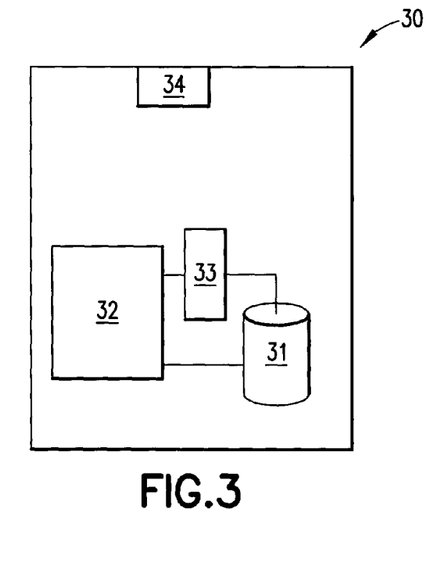
FIG. 3 shows a schematic diagram of a control apparatus according to some embodiments.

FIG. 3 shows an example of a control apparatus 30 for a communication system, for example to be coupled to and/or for controlling a base station. In some embodiments a base station may comprise an integrated control apparatus and some other embodiments the control apparatus can be provided by a separate network element. The control apparatus can be interconnected with other control entities. The control apparatus and functions may be distributed between a plurality of control units. In some embodiments each base station can comprise a control apparatus. In alternative embodiments, two or more base stations may share a control apparatus. The arrangement of the control depends on the standard, and for example in accordance with the current LTE specifications no separate radio network controller is provided. Regardless of the location, the control apparatus 30 can be understood as providing control on communications in the service area of at least one base station. The control apparatus 30 can be configured to provide control functions in accordance with embodiments described below. For this purpose the control apparatus can comprise at least one memory 31, at least one data processing unit 32, 33 and an input/output interface 34. Via the interface the control apparatus can be coupled to a base station or other parts of the base station to cause operation of the base station in accordance with the below described embodiments. The control apparatus can be configured to execute an appropriate software code to provide the control functions.

A wireless communication device, such as a mobile device, machine-like terminal or a base station, can be provided with a Multiple Input/Multiple Output (MIMO) antenna system. MIMO arrangements as such are known. MIMO systems use multiple antennas at the transmitter and receiver along with advanced digital signal processing to improve link quality and capacity. For example, the transceiver apparatus 26 of FIG. 2 can provide a plurality of antenna ports. More data can be received and/or sent where there are more antennae elements.

Inter-band TDD CA (carrier aggregation) with different UL/DL configurations on different bands has been proposed. Some embodiments relates to HARQ-ACK feedback on the PUCCH and/or PUSCH.

With inter-band TDD CA, different UL/DL configurations may be used on different carriers (cells). Inter band carrier aggregation of TDD component carriers with different uplink/down link configurations may give rise to certain advantages. For example, these advantages may include one or more of the following: coexistence with the neighbouring legacy TDD systems; supporting aggregation of traffic dependent carriers in heterogeneous networks; flexible configuration, for example more uplink subframes in the lower frequency bands for better coverage and/or more downlink subframes in high frequency bands for traffic transmission; and/or obtain a higher peak data rate.

LTE TDD allows for asymmetric uplink/down link allocation by providing seven different TDD uplink/down link configurations. This is shown in table of FIG. 6. These configurations may provide for example between 40 to 90% down link frames. There are configurations 0-6. Each configuration specifies which of ten subframes 0-9 are uplink subframes and which are downlink subframes. In some embodiments, subframes 0 and 5 contain a synchronization signal and broadcast information which allows the UE to perform synchronization and obtain relevant system information. These subframes are downlink subframes. Subframe 1 is a subframe which serves as a switching point between downlink to uplink transmission. This has a downlink pilot time slot and an uplink pilot time slot separated by a guard period. Depending on the switching point periodicity, in some UL/DL configurations subframe 6 may also serve as a switching point. In configuration number 0 (#0), subframes 2,3,4,7,8 and 9 are uplink subframes.

Figure 5:
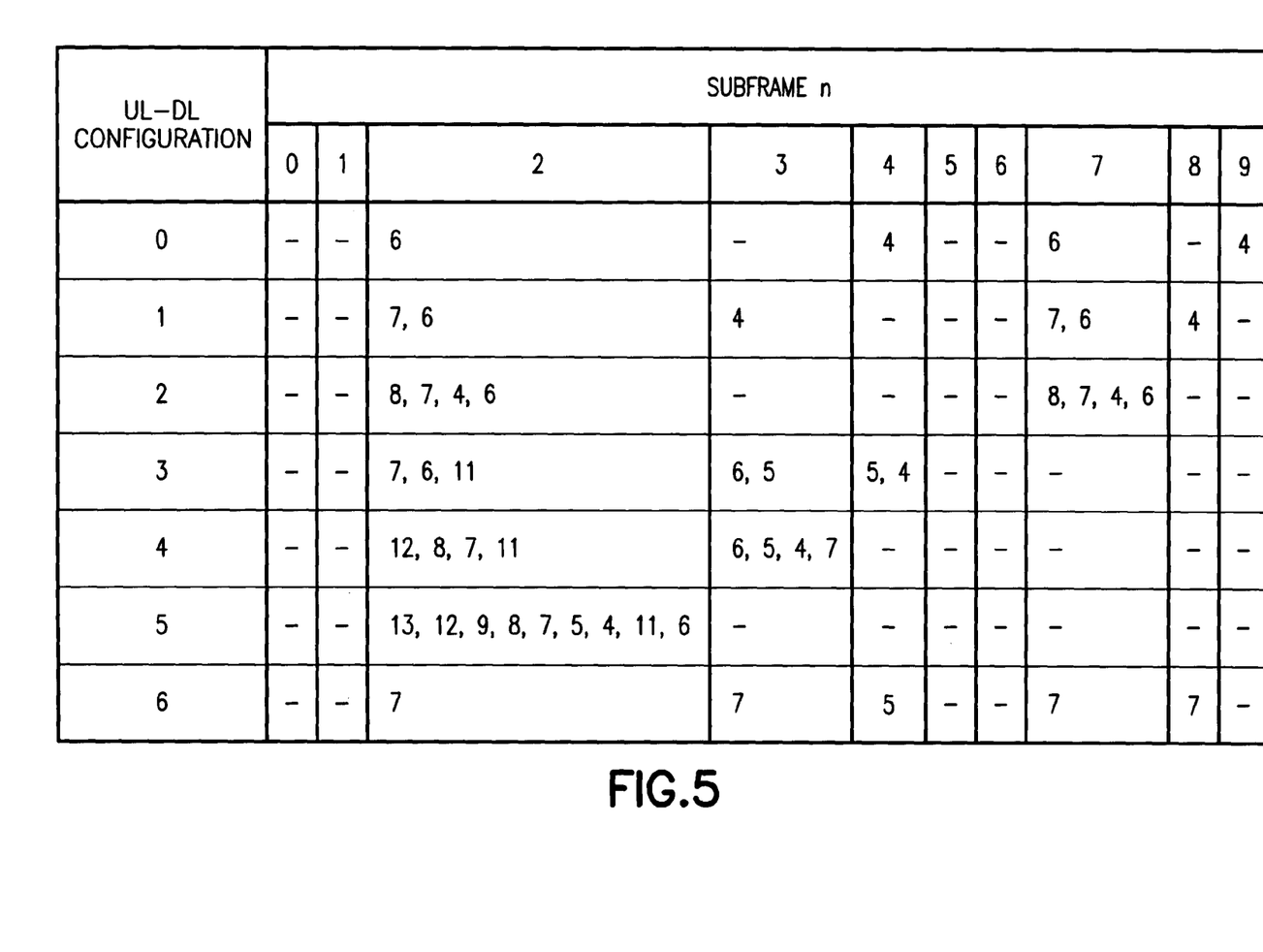
FIG. 5 shows a table of downlink association set index for TDD.

As different carriers or cells in a carrier aggregation system may use different UL/DL configurations, this means that the PDSCH HARQ timing may be different between carriers (cells) of an UE. HARQ timing is coupled with UL/DL configuration as shown in FIG. 5. The table of FIG. 5 shows which uplink subframes handling ACK/NACK feedback for certain downlink subframe(s) for each of the different UL/DL configurations of FIG. 6. For example, in UL/DL configuration #4, uplink subframe #2 handles feedback for downlink subframes which are 12, 8, 7, and 11 subframes earlier than uplink subframe 2, i.e. downlink subframes 0, 4, 5, and 1. Depending on the uplink-downlink configuration one uplink subframe may be responsible for ACK/NACK feedback for one or multiple downlink subframes. This means that HARQ feedback on different carriers may follow different timings.

One of the carriers or cells is the main cell or carrier and is referred to as the primary cell PCell. The other carriers or cells are referred to as secondary cells SCell.

Figure 6:
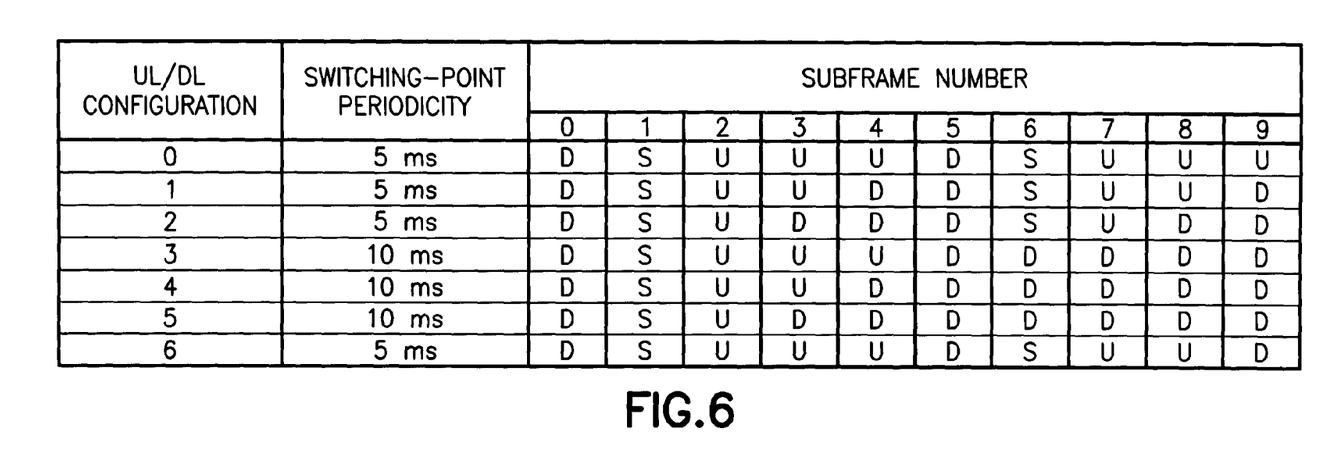
FIG. 6 shows a table of different UL/DL configurations.

A problem is, e.g. if PCell is UL/DL configuration 2 and the SCell is UL/DL configuration 0, the PDSCH on SCell subframe #0 will have HARQ feedback in subframe #4 following the HARQ timing of UL/DL configuration 0, but subframe #4 is DL subframe on PCell (see FIG. 6). This means that the HARQ feedback cannot be transmitted.

Figure 4:
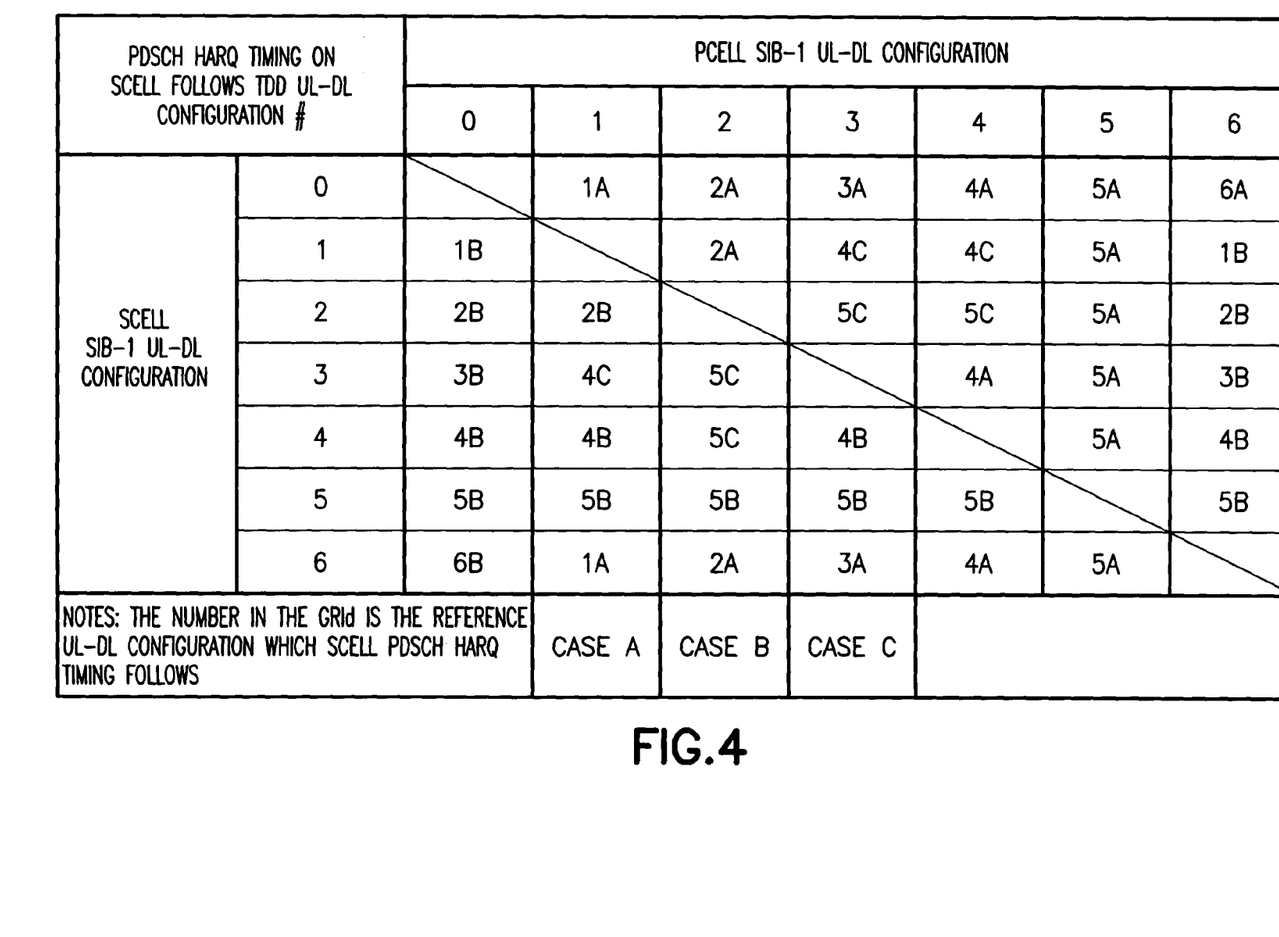
FIG. 4 shows reference UL-DL configuration which is used by a secondary cell SCell for PDSCH (physical downlink shared channel) HARQ timing.

A solution has been proposed in relation to Rel-11 to define a reference configuration for SCell, and the HARQ timing for SCell should follow the timing of reference configuration. This is illustrated in FIG. 4. In the example, the reference configuration for SCell should be UL/DL configuration 2, which is different from the SIB1 UL/DL configuration on the SCell.

The reference configuration may be different from the configured SIB1 (system information block) UL/DL configuration of a secondary cell (SCell). The HARQ timing in the SCell follows the HARQ timing specified for the associated reference configuration.

Reference is made to FIG. 4 which shows a mapping between SIB1 UL/DL configuration of SCells and associated reference configurations for all combinations in LTE of UL/DL configurations in the PCell and the SCell. The number in the grid indicates the UL/DL reference configuration for the HARQ timing in the SCell for the corresponding PCell/SCell combination. Where the UL/DL configuration is the same for both the PCell and the SCell, no problem arises.

The 42 PCell/SCell combinations in FIG. 4 may be categorized into three cases. The three cases A, B and C are indicated in each entry of the table.

Case A: The SCell DL subframes are a subset of the PCell DL subframes. In this case, the reference configuration for SCell HARQ timing is the PCell SIB1 UL/DL configuration.

Case B: The SCell DL subframes are a superset of the PCell DL subframes. In this case, the reference configuration for SCell HARQ timing is SCell SIB1 UL/DL configuration in for example the case of self-scheduling.

Case C: The SCell DL subframes are neither a superset nor a subset of the PCell DL subframes. In this case, the reference configuration for SCell HARQ timing is a third UL/DL configuration (different than PCell and SCell SIB1 UL/DL configuration) in for example the case of self-scheduling.

The principle in determining the reference configuration for the SCell HARQ timing is that the DL subframes of the reference configuration are the minimum superset of the DL subframes of both the PCell and SCell SIB1 UL/DL configuration. The reference configuration is used to determine the timing of the HARQ-ACK feedback from the UE to the eNB. The timing of retransmission from the eNB to the UE may be dynamically determined by the eNB scheduler (for example if asynchronous DL HARQ is used.).

The current status of standardization for inter-band TDD CA in LTE may be summarized as follows:

Cross carrier scheduling and self-scheduling will be supported,

In the case of self-scheduling, the PDSCH HARQ timing on PCell will follow the SIB1 UL/DL configuration timing configured for the PCell, but SCell will follow the HARQ timing of a selected reference UL/DL configuration as set out in the table of FIG. 4

No new HARQ timing will be introduced.

The PUCCH is only transmitted on PCell, and not the SCell.

It has been proposed that both format 3 and format 1b with channel selection should be supported. The PUCCH is an UL control channel which carries UL information.

PUCCH format 1b and format 3 use QPSK modulation. The number of bits is 2 for format 1b and 48 for format 3. Format 3 may be used in order to convey a relatively large number of ACK/NACK bits. For format 3 the HARQ-ACK codebook size may be determined per cell rather than a maximum value for all cells.

Thus, it has been proposed that for TDD inter-band carrier aggregation with different UL-DL configurations on different bands, a UE can be configured with PUCCH format 3 or PUCCH format 1 b with channel selection for HARQ-ACK transmission. For format 1b only 2 bit ACK/NACK bits can be transmitted. For 4 ACK/NACK bits feedback, channel selection will be used, i.e. using 1 out of 4 PUCCH resources to transmit 2-bits. The selection of PUCCH resource would indicate 2-bits.

At least for a self-scheduling case, for a UE configured with PUCCH format 3 for HARQ-ACK transmission, the HARQ-ACK transmission may follow the Rel-10 design but with the following differences:

The set of DL subframes (denoted as $K_c$) on the serving cell c associated with the UL subframes n may include the DL subframes n-k where k ∈ K and K is determined according to the timing reference configuration of the serving cell c. A serving cell may be a PCell or a SCell. "Timing" defines UL subframe n should be used for HARQ feedback for earlier DL subframes. In LTE, timing is defined as n-4 for FDD, and for TDD it is defined as n-k, k ∈ K. K is determined according to the reference UL/DL configuration for timing of the serving cell c as defined in FIG. 4.

For HARQ-ACK transmission in an UL subframe n and on the PUCCH or on PUSCH not adjusted by an UL grant, $B_c^{DL}=M_c$ where $M_c$ is the number of the element in set $K_c$ (see FIG. 5) and $B_c$ is the number of the downlink subframes for which a UE needs to feedback HARQ bits (Usually PUSCH is scheduled by UL grant. The PUSCH can also be retransmitted by receiving NACK from PHICH (Physical hybrid ARQ indicator channel), i.e. without UL grant).

For HARQ-ACK transmission in an UL subframe n and on the PUSCH (physical uplink shared channel) adjusted by an UL grant, $B_c^{DL}=\min(W_{DAI}^{UL}, M_c)$ if the timing reference configuration is #{1, 2, 3, 4, 6} where $W_{DAI}^U$ is determined by the Downlink Assignment Index (DAI) in DCI format 0/4 (See below). The eNB uses this information to indicate to the UE how many DL subframes in the set Kc are scheduled:

| DAI MSB, LSB | $W_{DAI}^{UL}$ |
|---|---|
| 0, 0 | 1 |
| 0, 1 | 2 |
| 1, 0 | 3 |
| 1, 1 | 4 |

For HARQ-ACK transmission in an UL subframe n and on the PUSCH adjusted by an UL grant, it is currently still under discussion for the value of $B_{cc}^{DL}$ if the TDD UL-DL configuration for which the timing reference configuration is #5;

The case where the timing reference configuration is #0, for HARQ-ACK transmission in an UL subframe n and on PUSCH adjusted by an UL grant, is not yet decided; and The Timing reference configuration is the TDD UL-DL configuration which the PDSCH (physical downlink shared channel) HARQ timing on serving cell c follows.

The treatment of format 3 for cross-carrier scheduling case has not been decided.

For a UE configured with the PUCCH format 1b with a channel selection for HARQ-ACK transmission, the HARQ-ACK transmission may follow the Rel-10 design except for the following:

The set of DL subframes (denoted as $K_c$) on the serving cell c associated with UL subframe n shall include the DL subframes n-k where k ∈ K and K is determined according to the reference timing configuration; and For HARQ-ACK transmission on the PUCCH the UE shall use the Rel-10 mapping table with $M=\max\{M_p, M_s\}$, where $M_p$ is the number of elements in set $K_c$ for the primary cell and $M_s$ is the number of elements in set $K_c$ for the secondary cell. The UE shall set DTX (discontinuous transmission) for {HARQ-ACK (min $\{M_p, M_s\}$), HARQ-ACK (M-1)} for the serving cell with the smaller $M_c$ value.

The HARQ-ACK transmission on the PUSCH has not yet been decided

Accordingly, it has been proposed that when the PCell is with SIB1 UL/DL configuration 0, the HARQ timing will follow UL/DL configuration 0; and when the SCell is with SIB1 UL/DL configuration 0 the HARQ timing will not follow UL/DL configuration 0. As shown in FIG. 4, if the SCell configuration is 0, the SCell configuration follows the PCell configuration which is not configuration 0.

In Rel-8/9/10, the DAI (downlink assignment indicator) field exists in the DL grant DCI (downlink control information) formats for all the TDD UL-DL configurations including UL/DL configuration 0 according to the current version of the 3GPP Specification 36.212. The downlink assignment index is a field in a downlink resource grant signalled to a UE indicating how many subframes in a previous time window have contained transmissions to that UE. However, currently this field is not interpreted by UE if the TDD UL-DL configuration is UL/DL configuration 0. In other words, the field is ignored by the UE. The SIB1 UL/DL configuration of the cell is UL/DL configuration 0, and the bundle window size is always "1" (M=1, see the first row in the table of FIG. 5. This table shows the downlink association set index K: $\{k_0, k_1, \ldots k_{M-1}\}$ for TDD).

As shown in FIG. 5, the LTE TDD system may be operated as a DL heavy system which results in a UL subframe usually used to transmit HARQ-ACKs corresponding to multiple DL subframes. The set of DL subframes for which the HARQ-ACKs are reported in the same UL frame is listed in the table of FIG. 5. The bundle window size is the number of elements in the set Kc. For example, for configuration 0 one UL subframe is used for HARQ feedback for only 1 DL subframe, M=1 or only 1 element in the set Kc. For other configurations, such as configuration 2, UL subframe #2 is used for HARQ feedback for 4 DL subframes, in this case M=4 or 4 elements in the set Kc.

In Rel-8/9/10, the DAI field does not exist in the UL grant DCI formats for UL/DL configuration 0 according to the current version of the 3GPP Specification 36.212, since the bundle window size is always "1" (M=1, see the first row in the table of FIG. 5).

Consider the case where the PCell SIB1 UL/DL configuration is UL/DL configuration 0. In this case, the reference configuration for HARQ timing on PCell is UL/DL configuration 0. The bundle window size on PCell is "1", but it may be larger than "1" on SCell. This problem may occur with PUCCH format 1b and 3. Currently, the codebook determination when HARQ-ACK is transmitted on the PUSCH on the PCell or SCell has not been considered. Some embodiments address this.

Consider the case that the SCell SIB1 UL/DL configuration is UL/DL configuration 0. In this example, the reference configuration for HARQ timing on PCell or SCell is not UL/DL configuration 0. It has not been specified whether DAI in UL grant exists in case where SIB1 UL/DL configuration of the cell is UL/DL configuration 0 but the reference configuration for HARQ timing is not. The codebook determination when HARQ-ACK is transmitted on the PUSCH on SCell has not been specified. Currently it has not been specified whether the usage of DAI depends on the SIB1 UL/DL configuration or the timing reference UL/DL configuration. When SCell is SIB1 UL/DL configuration 0, the timing reference UL/DL configuration for SCell is not UL/DL configuration 0, whether DAI usage is enabled or not has not been specified.

A problem is that for inter-band TDD CA, how to determine the codebook size has not been specified for the case where one of the aggregated cells is SIB1 UL/DL configuration 0 and HARQ feedback on the PUSCH is adjusted by UL grant. Some embodiments address how the codebook size should be determined.

It has not been considered previously whether DAI in DL grant should be interpreted by UE in case where SIB1 UL/DL configuration of the cell is UL/DL configuration 0 but the reference configuration for HARQ timing is not. Since DL DAI is used for HARQ-ACK feedback, the HARQ-ACK feedback may be significantly impacted if DL DAI is not utilized if the bundle window size is larger than "1" (M>1). In other words, the problem that for inter-band TDD CA, whether DL DAI should be used or not has not been specified for the case where SCell is SIB1 UL/DL configuration 0. In some embodiments, DL DAI is enabled in this situation.

In some embodiments, the codebook size determination for HARQ feedback on the PUSCH is provided when the UL/DL configuration 0 is SIB1 indicated configuration in at least one of the aggregated cells in an inter-band TDD CA, in order to handle the DAI issue in both UL and DL grant.

In Rel-8/9/10 with TDD configuration 0, the DAI field is re-used as UL index in UL grant (for example when there is no UL DAI), and is present but does not apply in DL grant. When a cell with SIB1 TDD configuration 0 is aggregated with cell(s) with other TDD configuration, there would be problems with HARQ-ACK on PUCCH/PUSCH if DAI field is used in the same way as in Rel-8/9/10.

In some embodiments, the codebook size determination for HARQ-ACK on PUSCH is adjusted by UL grant In some embodiments, for the case of inter-band TDD CA and one of cells (cell c) is with SIB1 TDD configuration 0, and the HARQ-ACK on the PUSCH is adjusted by UL grant, the codebook size determination may depend on the SIB1 TDD configuration of the PUSCH cell (the cell on which PUSCH is transmitted).

Consider the case where the PUSCH cell is with any of SIB1 TDD configurations 1-6. In this case, UL DAI is available, so the codebook size determination can utilize UL DAI. For a UE configured with PUCCH format 3, $B_c^{DL}=\min(W_{DAI}^{UL},Mc)$ if the timing reference configuration of cell c is TDD configuration $\{0, 1, 2, 3, 4, 6\}$, and $B_c^{DL}=W_{DAI}^{UL}+4\lceil(U-W_{DAI}^{UL})/4\rceil$ if the timing reference configuration of cell c is TDD configuration 5.

For a UE configured with PUCCH format 1b with channel selection, Rel-10 defined procedures for TDD configuration $\{1, 2, 3, 4, 6\}$ and PUSCH adjusted by UL grant can be re-used (even if one of aggregated cells is with SIB1 TDD configuration 0 in some embodiments).

Consider the case where the PUSCH cell is with SIB1 TDD configuration 0. In this case, if the DCI format 0/4 is kept unchanged the UL DAI is not available, so the codebook size should be determined without the UL DAI. For a UE configured with PUCCH format 3, $B_c^{DL}=Mc$ for each cell, where Mc is the number of elements in set Kc, and Kc is determined according to the timing reference configuration of serving cell c. For a UE configured with PUCCH format 1b with channel selection, Rel-10 defined procedures for TDD configuration $\{1, 2, 3, 4, 6\}$ and PUSCH adjusted by UL grant can be re-used (even one of aggregated cells is with SIB1 TDD configuration 0) with M=max(Mp,Ms).

In this case, if the DCI format 0/4 can be changed (e.g. adding 2-bit for UL DAI if SIB1 TDD configuration is TDD configuration 0 but PDSCH HARQ timing reference configuration is TDD configuration 1-6), UL DAI will be available, and the codebook size determination can utilize UL DAI. For a UE configured with PUCCH format 3, $B_c^{DL}=\min(W_{DAI}^{UL},Mc)$ if the timing reference configuration of cell c is TDD configuration $\{0, 1, 2, 3, 4, 6\}$, and $B_c^{DL}=W_{DAI}^{UL}+4\lceil(U-W_{DAI}^{UL})/4\rceil$ if the timing reference configuration of cell c is TDD configuration 5. For a UE configured with PUCCH format 1b with channel selection, Rel-10 defines procedures for TDD configuration $\{1, 2, 3, 4, 6\}$ and the PUSCH adjusted by UL grant may be re-used (even one of aggregated cells is with SIB1 TDD configuration 0).

In this case, if the DCI format 0/4 can be changed (e.g. adding 2-bit for UL DAI if SIB1 TDD configuration is TDD configuration 0 and PDSCH HARQ timing reference configuration is also TDD configuration 0), UL DAI will be available, and the codebook size determination can utilize UL DAI. For a UE configured with PUCCH format 3, $B_c^{DL}=\min(W_{DAI}^{UL},Mc)$ if the timing reference configuration of cell c is TDD configuration $\{0, 1, 2, 3, 4, 6\}$, and $B_c^{DL}=W_{DAI}^{UL}+4\lceil(U-W_{DAI}^{UL})/4\rceil$ if the timing reference configuration of cell c is TDD configuration 5. For a UE configured with PUCCH format 1b with channel selection, Rel-10 defines procedures for TDD configuration $\{1, 2, 3, 4, 6\}$ and the PUSCH adjusted by UL grant may be re-used (even one of aggregated cells is with SIB1 TDD configuration 0).

In some embodiments, for the case of inter-band TDD CA and one of cells (cell c) is with SIB1 TDD configuration 0, and the HARQ-ACK on PUSCH adjusted by UL grant, the codebook size determination should depend on the SIB1 TDD configuration of the PUSCH cell (the cell on which PUSCH is transmitted).

If the PUSCH cell is with SIB1 TDD configuration 1-6, the UL DAI is utilized for the codebook size determination.

If the PUSCH cell is with SIB1 TDD configuration 0, it is preferred that the codebook size is determined as if PUSCH is not adjusted by UL grant.

DL DAI will now be discussed. In the case SCell SIB1 configuration is TDD configuration 0, the reference configuration for SCell PDSCH HARQ timing would be PCell SIB1 configuration, the usage of DL DAI has currently not been specified.

If the DL DAI is not used in this case, there would be problems in HARQ-ACK feedback, as the bundling window size on SCell can be larger than "1" (M>1). Since DL DAI is used with M>1 in determining e.g. HARQ-ACK bit arrangement with PUCCH format 3, ACK/NACK on SR resource and ACK/NACK on CSI resource, the missing of the DL DAI in this case will cause incorrect HARQ-ACK feedback. Considering that DL DAI is already present in the DL assignment, some embodiments enable the usage of DL DAI for the cell with SIB1 configuration as TDD configuration 0 but the PDSCH HARQ timing reference configuration is not TDD configuration 0.

In some embodiments, for the case of inter-band TDD CA and the SCell is with SIB1 TDD configuration 0, the usage of DL DAI is enabled for the SCell.

The above described embodiments will now be described in more detail. In a first embodiment, DL DAI usage is always enabled and an UL DAI is added for a cell with a SIB1 indicated UL/DL configuration 0 if aggregated with another cell with different SIB1 UL/DL configuration. The interpretation of DL and UL DAI may be the same as the DL and UL DAI in other UL/DL configurations. However a difference is the UE interpretation of the DL grant and an extension of UL grant. In some embodiments a 2-bit field of UL DAI is added. With the current proposals, the UE does not read this 2-bit field. However, in some embodiments, the e UE reads the 2-bit field in the above mentioned conditions. The DL DAI is thus used to indicate to the UE how many DL subframes have been scheduled up to the detected DL grant.

Figure 7:
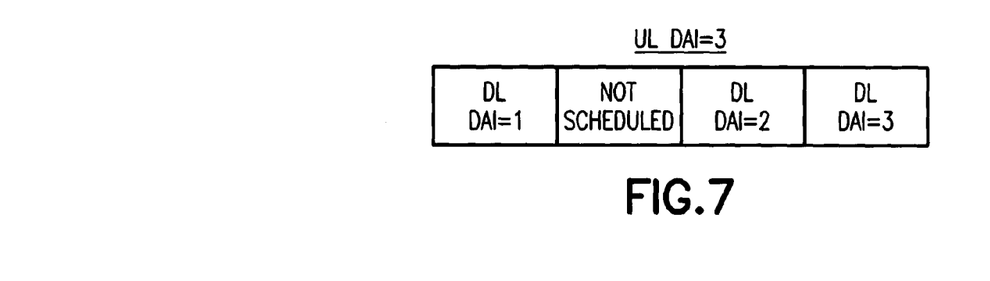
FIG. 7 shows an example of a DAI (downlink assignment indicator).

Reference is made to FIG. 7 which shows an example of UL DAI and DL DAI for M=4 and 3 scheduled DL subframes.

In a second embodiment, the following two proposals are used to ensure the correct HARQ ACK feedback if one of the serving cells is with SIB1 indicated UL/DL configuration 0. UL DAI is currently not used with UL/DL configuration 0. Therefore, in Rel-11, when a cell with SIB1 UL/DL configuration 0 is aggregated with a cell with SIB1 UL/DL configuration 1-6, the codebook size determination has not been specified. Currently because DL DAI is not used with UL/DL configuration 0 according to Rel-8/9/10, but this is needed in Rel-11, when a cell with SIB1 UL/DL configuration 0 is aggregated with a cell with SIB1 UL/DL configuration 1-6.

The first proposal under a second embodiment is that DL DAI usage is enabled for a cell with SIB1 indicated UL/DL configuration 0 but the PDSCH HARQ-ACK timing reference configuration for this cell is not configuration 0. The interpretation of DL DAI is same as DL DAI in other UL/DL configurations.

The second proposal under a second embodiment is if serving cell (either PCell or SCell) is with SIB1 indicated UL/DL configuration 0 and HARQ-ACK is to be transmitted on the PUSCH scheduled on this serving cell with UL grant, the codebook size is determined for each serving cell c, as $B_c^{DL}=M_c$, if PUCCH format 3 is configured and either according to $B_c^{DL}=M_c$, or according to $B_c^{DL}=\max\{M_p,M_s\}$ if PUCCH format 1b with channel selection is configured (the codebook generation is as same as Rel-10 defined procedures for TDD configuration {1, 2, 3, 4, 6} and PUSCH not adjusted by UL grant, even here one of aggregated cells is with SIB1 TDD configuration 0). In other words, the codebook size is determined as if PUSCH is not adjusted by an UL grant.

In a third embodiment, the following two proposals may be used together to ensure correct HARQ ACK feedback if one of the serving cells is with SIB1 indicated UL/DL configuration 0.

The first proposal under a third embodiment is DL DAI usage is enabled and UL DAI is added for a cell with SIB1 indicated UL/DL configuration 0 but PDSCH HARQ-ACK timing reference configuration for this cell is not configuration 0. The interpretation of DL DAI and UL DAI is same as DL DAI and UL DAI in other UL/DL configurations.

The second proposal under a third embodiment is if the PCell is a SIB1 indicated UL/DL configuration 0 and HARQ-ACK is to be transmitted on the PUSCH scheduled PCell with UL grant, the codebook size is determined for each serving cell c, as $B_c^{DL}=M_c$ if PUCCH format 3 is configured and either according to $B_c^{DL}=M_c$, or according to BcDL=max {$M_p$, Ms} if the PUCCH format 1b with channel selection is configured (the codebook generation is as same as Rel-10 defined procedures for TDD configuration {1, 2, 3, 4, 6} and PUSCH not adjusted by UL grant, even here one of aggregated cells is with SIB1 TDD configuration 0). In other words, the codebook size is determined as if PUSCH is not adjusted by an UL grant.

The above mentioned solutions are assuming self scheduling. But the proposals can also be used for supporting inter-band TDD CA when cross-carrier scheduling is used. Self-scheduling means that the grant for PDSCH/PUSCH on cell c is transmitted on cell c, while cross-carrier scheduling means the grant for PDSCH/PUSCH on cell c is transmitted on a different cell.

Consider the situation where PCell SIB1 UL/DL configuration is UL/DL configuration 0.

This is similar to the second alternative mentioned previously and there are two options depending on the reference configuration for SCell HARQ timing.

If SCell HARQ timing follows PCell SIB1 UL/DL configuration (UL/DL configuration 0. In this case there may be no issue to address.

If the SCell HARQ timing follows SCell SIB1 UL/DL configuration (not UL/DL configuration 0), then the above embodiments may be applied. For example the first embodiment, the second alternative of the second embodiment and the second alternative of the third embodiment may be used.

Consider the situation where SCell SIB1 UL/DL configuration is UL/DL configuration 0.

The first, second and first alternative of the third embodiment may be used.

Thus in some embodiments if one of the PCell and SCell is a SIB1 configuration 0, and the PUSCH is on the other cell, then the UL DAI is used.

If one of the PCell and SCell is a SIB1 configuration 0 and the PUSCH is on that cell then there are three alternative solutions.

The HARQ feedback should be transmitted for both PCell and SCell (so the codebook size for each cell needs to be determined), but it can only be transmitted on one of the aggregated cells. If there is no PUSCH transmitted on any of the aggregated cells, the HARQ feedback can only be transmitted on the PUCCH on the PCell. If PUSCH is transmitted on any of the aggregated cells, the HARQ feedback will be transmitted on PUSCH, regardless of if the PUSCH is scheduled on PCell or SCell.

In Rel-10, the UL/DL configuration on all aggregated cells is same. When PUSCH is scheduled by UL grant and with UL/DL configuration 1-6, the 2-bit UL-DAI field is included in the UL grant, and it is then used to determine the codebook size for each cell (a common UL DAI is used to determine the codebook size). When PUSCH is not scheduled by UL grant or with UL/DL configuration 0, there is no UL DAI, and the codebook size is determined by the UL/DL configuration for each cell.

In Rel-11 the SIB1 UL/DL configurations on PCell and SCell can be different. Consider the case where one of cells (either PCell or SCell) is with SIB1 UL/DL configuration 0, and the HARQ-ACK is transmitted on PUSCH scheduled by UL grant. This gives the following cases:
TDD configuration 0 is on PCell
PUSCH on PCell
PUSCH on SCell
TDD configuration 0 is on SCell
PUSCH on PCell PUSCH on SCell In a first alternative, if the PUSCH is transmitted on a cell with SIB1 UL/DL configuration 0 (either PCell or SCell), there is no UL DAI as in Rel-10, and the UL/DL configuration on each cell is used to determine the codebook size for the corresponding cell; if PUSCH is transmitted on the other cell with UL/DL configuration 1-6 (either SCell or PCell), UL DAI is available, and the UL DAI (which is common for all cells) is used to determine the codebook size for each cell.

TDD configuration 0 is on PCell

PUSCH on PCell has no UL DAI, use UL/DL configuration on each cell to determine the codebook size for the corresponding cell PUSCH on the SCell has UL DAI, use UL DAI (which is common for all cells) to determine the codebook size for each cell TDD configuration 0 is on SCell PUSCH on PCell has UL DAI, use UL DAI (which is common for all cells) to determine the codebook size for each cell PUSCH on SCell has no UL DAI, use UL/DL configuration on each cell to determine the codebook size for the corresponding cell In a second alternative, a 2-bit UL DAI is added to the UL grant scheduling PUSCH on SCell, although the SIB1 UL/DL configuration on SCell is UL/DL configuration 0 (the HARQ timing reference configuration for SCell is not UL/DL configuration 0).

TDD configuration 0 is on PCell

PUSCH on PCell has no UL DAI, use UL/DL configuration on each cell to determine the codebook size for the corresponding cell PUSCH on SCell has UL DAI, use UL DAI (which is common for all cells) to determine the codebook size for each cell TDD configuration 0 is on SCell PUSCH on PCell has UL DAI, use UL DAI (which is common for all cells) to determine the codebook size for each cell PUSCH on SCell has UL DAI, use UL DAI (which is common for all cells) to determine the codebook size for each cell In a third alternative, a 2-bit UL DAI is added to the UL grant scheduling PUSCH on SCell although the SIB1 UL/DL configuration on SCell is UL/DL configuration 0 (the HARQ timing reference configuration for SCell is not UL/DL configuration 0), and also UL grant scheduling PUSCH on PCell although SIB1 UL/DL configuration on PCell is UL/DL configuration 0 (the HARQ timing reference configuration for PCell is still UL/DL configuration 0).

TDD configuration 0 is on PCell

PUSCH on PCell has UL DAI, UL DAI (which is common for all cells) to determine the codebook size for each cell PUSCH on SCell has UL DAI, use UL DAI (which is common for all cells) to determine the codebook size for each cell TDD configuration 0 is on SCell PUSCH on PCell has UL DAI, use UL DAI (which is common for all cells) to determine the codebook size for each cell PUSCH on SCell has UL DAI, use UL DAI (which is common for all cells) to determine the codebook size for each cell In some embodiments PDSCH HARQ-ACK feedback is handled for inter-band TDD CA in case that SIB1 configuration of at least one of the aggregated cells is configuration 0.

In the above described embodiments, PUCCH formats 1b and 3 are described as being used. It should be appreciated that this is by way of example only and other embodiments may use different formats.

Embodiments may be used with other releases of the LTE standard and/or with other standards.

Reference has been made to a particular configuration. Some embodiments may be applied to other configurations.

Reference has been made to HARQ. Other embodiments may be used with different error control processes.

Reference has been made to various channels. It should be appreciated that other embodiments may be used with other channels.

It is noted that whilst embodiments have been described in relation to LTE, similar principles can be applied to any other communication system or to further developments with LTE. Thus, although the embodiments are described with references to uplink and downlink, this disclosure is not limited by these directions between a base station and a user terminal. Instead, the invention is applicable to any system with transmissions between two or more communicating entities. For example, a communication system may be provided by means of a plurality of user equipment, for example in adhoc networks. Therefore, although certain embodiments were described above by way of example with reference to certain exemplifying architectures for wireless networks, technologies and standards, embodiments may be applied to any other suitable forms of communication systems than those illustrated and described herein.

The required data processing apparatus and functions of a base station apparatus, a communication device and any other appropriate apparatus may be provided by means of one or more data processors. The described functions at each end may be provided by separate processors or by an integrated processor. The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non limiting examples. The data processing may be distributed across several data processing modules. A data processor may be provided by means of, for example, at least one chip. Appropriate memory capacity can also be provided in the relevant devices. The memory or memories may be of any type suitable to the local technical environment and may be implemented using any suitable data storage technology, such as semiconductor based memory devices, magnetic memory devices and systems, optical memory devices and systems, fixed memory and removable memory.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof. The software may be stored on such physical media as memory chips, or memory blocks implemented within the processor, magnetic media such as hard disk or floppy disks, and optical media such as for example DVD and the data variants thereof, CD.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed there is a further embodiment comprising a combination of one or more of any of the other embodiments previously discussed.

The invention claimed is:

1. A method comprising:
communicating with a user equipment in an evolved universal terrestrial radio access network comprising a primary cell and a secondary cell, wherein the primary cell and the secondary cell are using a System Information Block Type 1 uplink and downlink configuration 0, and wherein based on at least the use of the System Information Block Type 1uplink and downlink configuration 0 a timing reference configuration for hybrid automatic repeat request feedback is using a timing configuration that does not follow the uplink and downlink configuration 0;
indicating to the user equipment with downlink assignment index information in a downlink grant how many subframes associated with the hybrid automatic repeat request feedback of an uplink subframe contain transmissions to the user equipment; and
receiving the hybrid automatic repeat request feedback on a physical uplink control channel, wherein the secondary cell and primary cell provide an aggregated carrier, and wherein physical uplink control channel format 3 is used in a transmission of the hybrid automatic repeat request feedback.

2. A computer program product comprising a non-transitory computer-readable storage medium bearing computer program code embodied therein for use with a computer, the computer program code comprising code executed by a processor to perform the method of claim 1.

3. A method comprising;
communicating, by a user equipment, in an evolved universal terrestrial radio access network comprising a primary cell and a secondary cell, wherein the primary cell and the secondary cell are using a System Information Block Type 1 uplink and downlink configuration 0, and wherein based on at least the use of the System Information Block Type 1 uplink and downlink configuration 0 a timing reference configuration for hybrid automatic repeat request feedback is using a timing configuration that does not follow the uplink and downlink configuration 0;
determining, by the user equipment, based on downlink assignment index information in a downlink grant how many subframes associated with the hybrid automatic repeat request feedback of an uplink subframe contain transmissions to the user equipment; and
transmitting the hybrid automatic repeat request feedback on a physical uplink control channel, wherein the secondary cell and primary cell provide an aggregated carrier, and wherein physical uplink control channel format 3 is used in the transmission of the hybrid automatic repeat request feedback.

4. A computer program product comprising a non-transitory computer-readable storage medium bearing computer program code embodied therein for use with a computer, the computer program code comprising code executed by a processor to perform the method of claim 3.

5. An apparatus comprising:
at least one processor, and
at least one memory including computer code for one or more programs, the at least one memory and the computer code configured, with the at least one processor, to cause the apparatus at least to:
communicate with a user equipment in an evolved universal terrestrial radio access network comprising a primary cell and a secondary cell, wherein the primary cell and the secondary cell are using System Information Block Type 1 uplink and downlink configuration 0, wherein based on at least the use of the System Information Block Type 1uplink and downlink configuration 0 a timing reference configuration for hybrid automatic repeat request feedback is using a timing configuration that does not follow the uplink and downlink configuration 0;
indicate to the user equipment with downlink assignment index information in a downlink grant how many subframes associated with the hybrid automatic repeat request feedback of an uplink subframe contain transmissions to the user equipment; and
receive the hybrid automatic repeat request feedback on a physical uplink control channel, wherein the secondary cell and primary cell provide an aggregated carrier, and wherein physical uplink control channel format 3 is used in a transmission of the hybrid automatic repeat request feedback.

6. An apparatus comprising:
at least one processor, and
at least one memory including computer code for one or more programs, the at least one memory and the computer code configured, with the at least one processor, to cause the apparatus at least to:
communicate in an evolved universal terrestrial radio access network in an evolved universal terrestrial radio access network comprising a primary cell and a secondary cell, wherein the primary cell and the secondary cell are using System Information Block Type 1uplink and downlink configuration 0, wherein based on at least the use of the System Information Block Type 1 by the secondary cell uplink and downlink configuration 0 a timing reference configuration for hybrid automatic repeat request feedback is using a timing configuration that does not follow the uplink and downlink configuration 0;
determine based on downlink assignment index information in a downlink grant how many subframes associated with the hybrid automatic repeat request feedback of an uplink subframe contain transmissions to the user equipment; and
transmit the hybrid automatic repeat request feedback on a physical uplink control channel, wherein the secondary cell and primary cell provide an aggregated carrier, and wherein physical uplink control channel format 3 is used in the transmission of the hybrid automatic repeat request feedback.

* * * * *

UNITED STATES PATENT AND TRADEMARK OFFICE
CERTIFICATE OF CORRECTION

Page 1 of 1

PATENT NO. : 9,913,254 B2
APPLICATION NO. : 13/957723
DATED : March 6, 2018
INVENTOR(S) : Li Zhang and Chun Hai Yao It is certified that error appears in the above-identified patent and that said Letters Patent is hereby corrected as shown below:

In the Claims

In Claim 5:
Column 18, Line 20, "luplink" should be deleted and --1 uplink-- should be inserted.

Signed and Sealed this
Twenty-ninth Day of May, 2018

Andrei Iancu
*Director of the United States Patent and Trademark Office*